United States Patent [19]

Ogron

[11] 3,944,461
[45] Mar. 16, 1976

[54] MACHINE FOR LAMINATING GLASS
[75] Inventor: Bernard L. Ogron, Morton Grove, Ill.
[73] Assignee: Globe Glass & Trim Company, Ill.
[22] Filed: Nov. 18, 1974
[21] Appl. No.: 524,473

[52] U.S. Cl. ............... 156/538; 29/122; 134/64 R; 156/106; 156/302; 156/552; 198/137
[51] Int. Cl.² .................... B32B 17/10; C03C 27/12
[58] Field of Search ............................. 156/99–108, 156/247, 249, 267, 297, 299–302, 389, 532, 543, 552; 134/61, 64, 68, 72; 198/234, 238, 240, 246, 229, 137, 202; 161/192; 29/110, 122; 65/25 A, 27, 28, 36, 56, 158, 159, 245, 323; 428/410, 426, 437

[56] References Cited
UNITED STATES PATENTS

| | | | |
|---|---|---|---|
| 2,156,680 | 5/1939 | Dennison | 156/106 |
| 2,159,630 | 5/1939 | Haux et al. | 156/106 |
| 2,899,967 | 8/1959 | Firestone | 134/64 |
| 3,400,018 | 9/1968 | Morgan et al. | 156/323 |
| 3,556,890 | 1/1971 | Buckley et al. | 161/125 |
| 3,595,251 | 7/1971 | Tarantola | 134/68 |
| 3,666,077 | 5/1972 | Marshall | 198/127 R |
| 3,837,952 | 9/1974 | Mogford | 156/99 |

Primary Examiner—William A. Powell
Assistant Examiner—John E. Kittle
Attorney, Agent, or Firm—Jack C. Berenzweig; Jerold A. Jacover

[57] ABSTRACT

A machine for continuously laminating a flexible film onto a succession of glass substrates is disclosed. The machine comprises a conveyor, adapted to transport a succession of glass substrates along a horizontal plane toward substrate preparation means which wash one surface of each substrate. The machine further includes guide means for safely guiding and alignably transporting the succession of glass substrates from the substrate preparation means to a predetermined application line associated with application means. The application means are adapted to continuously unroll and expose a quantity of flexible film having a pressure sensitive adhesive surface at the predetermined application line which lies in the horizontal plane, whereby film is continuously laminated onto the surface of each successive glass substrate to produce sheets of shatter-proof glass.

13 Claims, 7 Drawing Figures

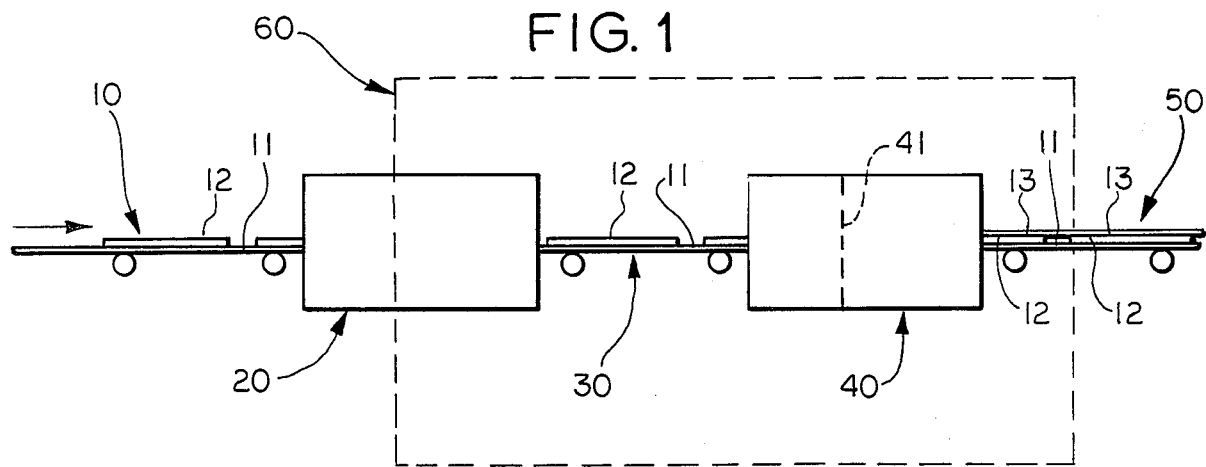
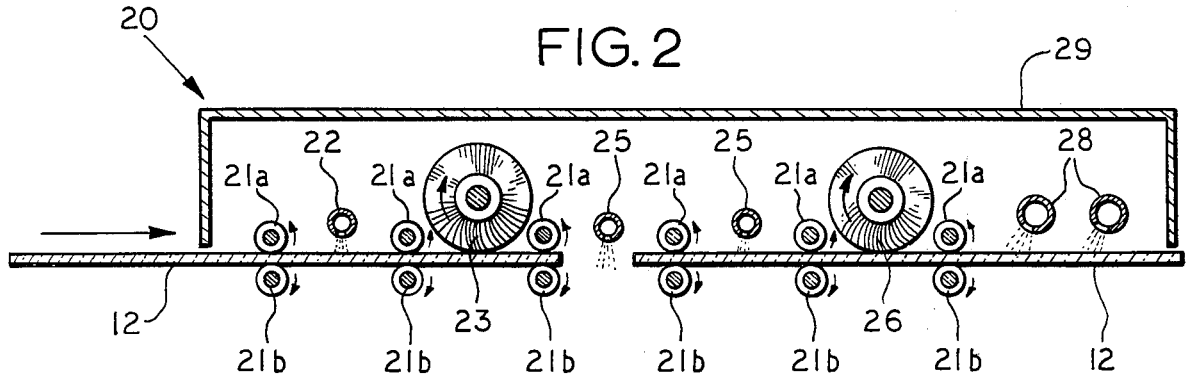
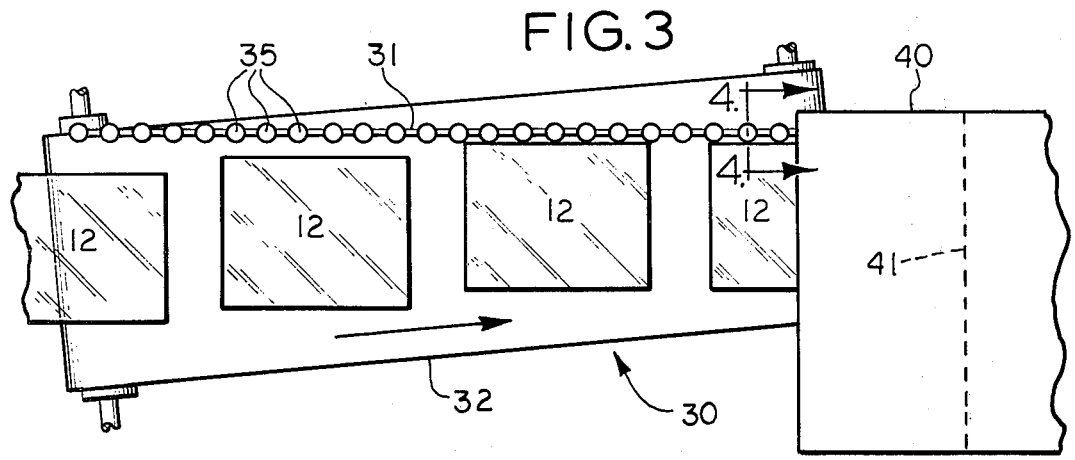
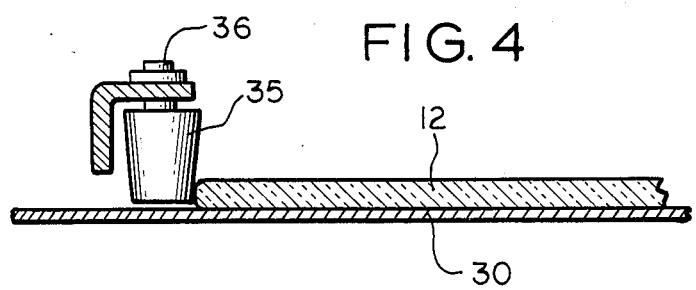

MACHINE FOR LAMINATING GLASS

BACKGROUND OF THE INVENTION

This invention pertains to a machine for laminating one material onto another. More particularly, the invention relates to a system for continuously laminating a thin film, such as a transparent thermoplastic layer, onto a succession of glass substrates to produce sheets of shatterproof glass.

Machines and methods for laminating various materials onto substrates such as cellular cores, particle board, plywood and metal panels are not new. Due to the opaque or nontransparent nature of such substrates, however, no special apparatus or procedure is generally required to prevent foreign matter, such as dust and the like, from being trapped between the laminated material and the substrate. On the other hand, when a flexible film is laminated onto a transparent substrate such as glass, it is of critical importance to prevent visible matter from being sandwiched between the film and the substrate. Moreover, unlike more commonly laminated substrates of the type described, the brittle qualities of glass, which make it susceptible to breakage and chipping, are well-known. Accordingly, the problems attendant in laminating a flexible film onto a glass substrate are much more acute than those involved in applying a lamination to most other substrates.

It is therefore a primary object of the invention to overcome these and other problems by providing an improved machine for laminating a flexible film onto a substrate. The improved laminating system permits the continuous application of a flexible film onto a succession of glass sheets to produce high quality shatterproof glass. The system accomplishes this result by sanitarily providing, safely guiding, and alignably transporting glass sheets prior to the application thereon of a flexible laminating film. Accordingly, it is another object of the invention to provide an improved laminating system adapted to continuously apply a flexible film to a succession of glass substrates for producing sheets of shatterproof glass.

SUMMARY OF THE INVENTION

The foregoing objects, along with other objects, features and advantages, are achieved in an improved machine for continuously laminating flexible film onto a succession of glass substrates. The machine comprises conveyor means, adapted to receive a succession of glass substrates and to transport said glass substrates along a horizontal plane to substrate preparation means. The substrate preparation means cooperate with the conveying means to receive therefrom the succession of glass substrates, and to wash one surface thereof. Application means, adapted to continuously unroll a quantity of flexible film having a pressure sensitive adhesive surface, expose that adhesive surface along a predetermined application line on the horizontal plane. The machine further includes guide means, for safely guiding and alignably transporting the succession of glass substrates from the substrate preparation means to the predetermined application line, whereby the film is continuously laminated onto the surface of each of a succession of glass substrates to form sheets of shatterproof glass.

BRIEF DESCRIPTION OF THE DRAWINGS

An exemplary embodiment of the invention summarized above is illustrated in the accompanying drawing in which:

FIG. 1 is a schematic view of the laminating system of the invention;

FIG. 2 is an enlarged sectional view of the substrate preparation means shown in FIG. 1;

FIG. 3 is an enlarged top view of the guide means portion of the invention shown in FIG. 1;

FIG. 4 is an enlarged sectional view of a portion of the guide means taken along lines 4—4 of FIG. 3;

DETAILED DESCRIPTION OF AN EXEMPLARY EMBODIMENT

Figure 5:
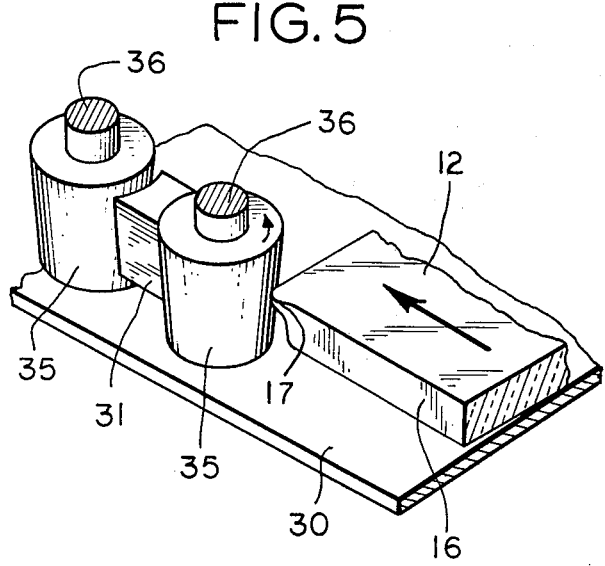
FIG. 5 is an enlarged side view of another portion of the guide means shown in FIG. 3 illustrating a glass substrate at a particular position relative to said guide means.

The general construction and operation of the exemplary laminating machine can be understood by referring to FIG. 1. In brief, a succession of glass substrates 12 are placed by any suitable means, including manual, onto a conveyor designated generally by reference numeral 10. Conveyor 10 is a moving surface which defines a horizontal plane 11. As shown in FIG. 1, plane 11 extends across the entire length of the laminating machine.

Substrate preparation means, designated by reference numeral 20, cooperate with conveyor 10 to successively receive glass substrates therefrom. As explained in greater detail hereinafter, substrate preparation means 20 cleans the top surface of each glass substrate in preparation for the lamination thereon of a thin transparent film. In this exemplary embodiment, a sanitary enclosure 60 extends from the output of substrate preparation means 20 to the end of the laminating machine, to provide a sanitary environment for laminating the film onto the succession of glass substrates 12. Accordingly, enclosure 60 prevents foreign matter such as dust particles and the like from being sandwiched between the film and the substrate.

After the washed substrates emerge from substrate preparation means 20, they are transported by guide means 30 to application means 40. To insure safe passage of the succession of glass substrates to application means 40, guide means 30 include means for reducing breakage and chipping. However, in the event chipping does occur, guide means 30 include means for safely deflecting spurious glass fragments away from the apparatus or any attendant who may be in the vicinity.

As explained in greater detail hereinafter, guide means 30 further include means for accurately aligning the glass substrates prior to reaching a film application line 41 associated with application means 40. Film application line 41 lies in plane 11, and extends perpendicularly to the movement of glass substrates 12. Application means 40 is adapted to expose a pressure sensitive adhesive surface of a flexible film 13, such as a thin transparent thermoplastic layer, at film application line 41. Thus, as the succession of glass substrates 12 pass through application means 40, flexible film 13 is laminated onto the top surface of each substrate to produce sheets of shatterproof glass.

A second conveyor 50, cooperates with application means 40 to transport the sheets of shatterproof glass to cutting and packaging stations (not shown). At the cutting station, excess film is removed from the substrate, thereby readying completed shatterproof glass sheets for packaging and shipping. Since the glass substrates are inside enclosure 60 from the time the glass is washed to the time the film is laminated onto the washed surface, foreign matter will not generally become trapped between the substrate and the film. Accordingly, minimal visual interference in the completed shatterproof sheets results. Moreover, through the use of guide means 30, breakage and chipping is minimized, deflection of spurious fragments is attained, and accurate alignment prior to lamination is achieved.

A better understanding of the construction and operation of the exemplary embodiment can be obtained by referring to the enlarged illustrations of the various components of the laminating machine shown in FIG. 1. For example, FIG. 2 represents an enlarged, detailed view of substrate preparation means 20. Substrate preparation means 20 include a plurality of top and bottom pinch rollers designated by reference numerals 21a and 21b, respectively. Pinch rollers 21a and 21b are energized by conventional means (not shown), and are adapted to receive glass substrates 12 from conveyor 10, and guide them through a housing 29. Housing 29 encloses detergent application means 22 adapted to apply a cleansing spray onto at least one surface of each glass substrate entering housing 29. In the exemplary embodiment, only the top surface of each glass substrate 12 is sprayed with detergent by means 22, though it should be clear that the bottom surface could likewise be sprayed if desired.

Substrate preparation means 20 further include a rotatable cylindrical brush 23, disposed beyond detergent application means 22. Brush 23 is aligned to scrub the top surface of each glass substrate 12 as it moves through housing 29. After scrubbing, the top surfaces of the glass substrates are exposed to rinsing means 25 which typically include brass pipes adapted to direct a stream of clean water onto the top surface of glass substrates 12.

After rinsing, pinch rollers 21a, 21b successively transport each glass substrate into contact with a second rotatable cylindrical brush 26. Brush 26 removes excess rinse water from the top surface of substrate 12 prior to drying. Drying may be accomplished by any well-known means, such as a plurality of blower tubes 28 which direct a continuous blast of ambient air onto substrate 12. Since the air originates from inside sanitary enclosure 60, it is generally free from any foreign material such as dust and the like. Accordingly, each glass substrate 12 generally emerges from housing 29 without any spuriously derived particles on the top surface.

After passing through preparation means 20, the succession of glass substrates is transported to application means 40 by guide means 30. A detailed illustration of guide means 30, shown in FIG. 3, depicts an endless belt 32 in horizontal plane 11, moving generally toward film application line 41, and disposed at an acute angle relative to a guide rail 31. Guide rail 31 is preferably perpendicular to the output of substrate preparation means 20, the entrance of application means 40, and film application line 41. Thus, the movement of belt 32 eventually causes a longitudinal edge 16 of each glass substrate 12 to contact guide rail 31, thereby aligning each glass substrate with film application line 41 prior to entering application means 40.

Disposed along the length of guide rail 31 are a plurality of uniformly spaced rollers 35. As shown in greater detail in FIG. 4, each of rollers 35 is in the form of an inverted truncated cone, and in this exemplary embodiment is fabricated from resilient material to cushion the impact of glass substrates 12 which come into contact therewith. An axle 36, associated with each of rollers 35, facilitates the rotation of rollers 35, whereby glass substrates 12 slide along guide rail 31 with minimal chipping or breakage.

Due to imperfections in glass substrates 12 which may inevitably occur during manufacture, a certain amount of chipping cannot generally be prevented. For example, as shown in FIG. 5, a bulge 17 may exist in an upper portion of the longitudinal edge 16 of glass substrate 12 which is moved into contact with rollers 35 by endless belt 32. The impact of substrate 12 with rollers 35 may cause bulge 17 to break away from glass substrate 12, thereby producing fragments such as the one identified by reference numeral 18 in FIG. 6. Because of the inverted truncated conical shape of rollers 35, however, the larger upper diameter of roller 35 will prevent fragments 18 from flying dangerously upward. Instead, fragments 18 will fall safely downward, away from an attendant who might be in the vicinity. Further, the downward movement of fragment 18 prevents it from landing on the top surface of glass substrate 12, previously cleaned and washed by substrate preparation means 20. As a result, spuriously derived fragments such as fragment 18 will not interfere with the laminating machine, or its laminating operations.

Figure 6:
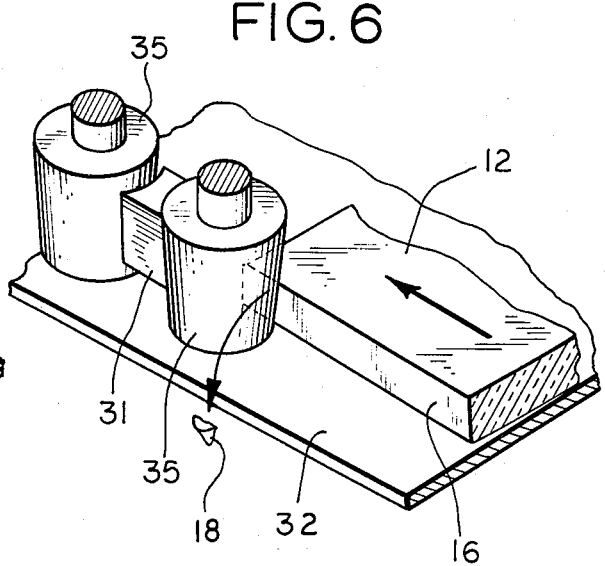
FIG. 6 is an enlarged side view of the same portion of the guide means shown in FIG. 5, illustrating a glass substrate at a subsequent position relative to said guide means.

Still referring to FIGS. 5 and 6, it should be recognized that, due to the inverted conical shape of rollers 35, only the upper reaches of longitudinal edge 16 of glass substrate 12 come into contact with rollers 35. Thus, if an imperfection such as bulge 17 exists near the bottom portion of longitudinal edge 16, the substrate will pass along guide rail 31 with the bulge remaining out of contact with the lower, tapered portions of rollers 35. As a result, these lowerly disposed imperfections will not be broken off of glass substrate 12, thereby reducing chipping and breakage accordingly.

Figure 7:
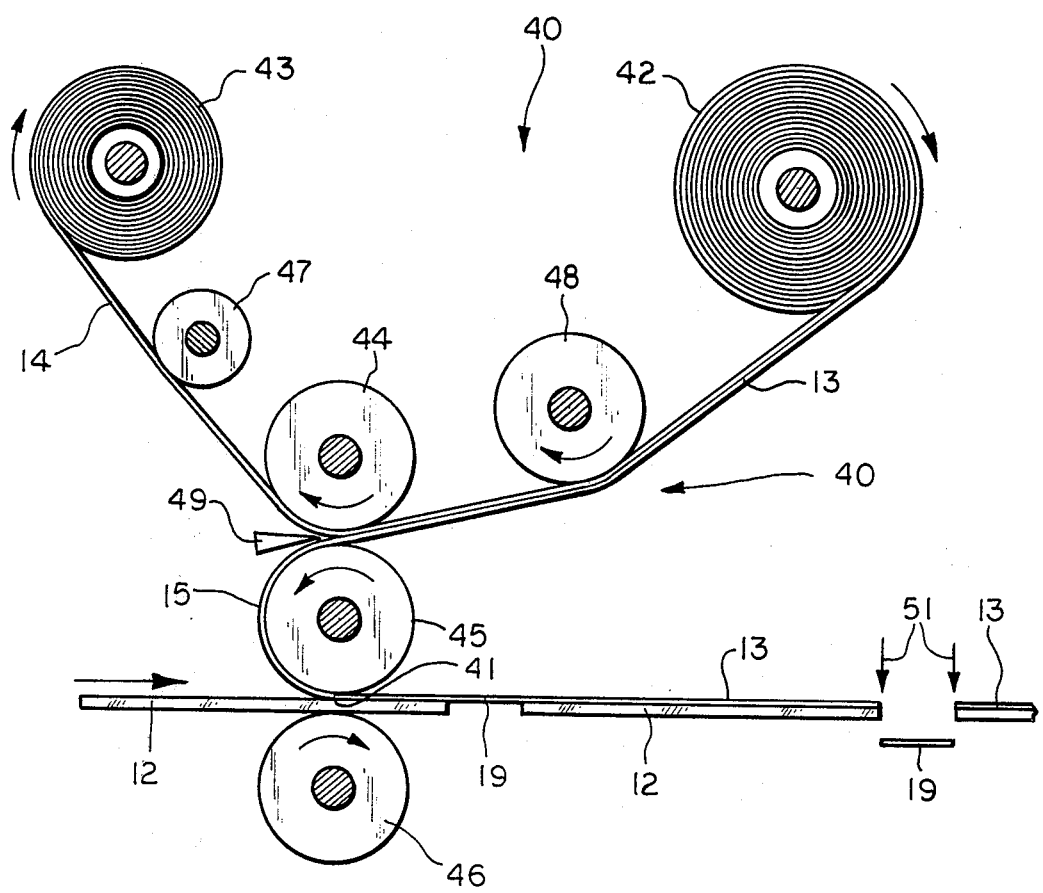
FIG. 7 is an enlarged schematic view of the application means shown in FIG. 1.

As mentioned hereinbefore, guide means 30 alignably transports the succession of glass substrates 12 to application means 40 where a thin, flexible film is laminated onto the prepared surface of each substrate. A detailed illustration of application means 12 is depicted by FIG. 7 wherein a supply roller 42 carrying a rolled quantity of flexible film 13 is shown. Film 42 conventionally has a pressure sensitive adhesive surface 15, covered by a protective backing 14. Moreover, in this exemplary embodiment, the width of film 13 is precisely equal to the width of the succession of glass substrates to be laminated.

In operation, supply roller 42 is energized by conventional means (not shown), so that film 13 is passed to separation means 49 via a pair of guide rollers 48 and 44. Separation means 49 are adapted to continuously remove backing 14 from film 13, thereby exposing pressure sensitive adhesive surface 15. Backing 14 is then passed by way of a guide roller 47 to a takeup roller 43 where it is collected, and ultimately discarded. After removal of backing 14, film 13 is partially wound around an application roller 45 so that pressure sensitive adhesive surface 15 is exposed at film application line 41. Simultaneously, glass substrates 12 are transported through application means 40 at a speed corresponding to the rate at which film 13 is unrolled from supply roller 42. Further, as explained hereinbefore, guide rail 31 of guide means 30 alignably transports glass substrates 12 so that the leading edges thereof coincide with film application line 41. Accordingly, application roller 45, backed by a pressure roller 46, continuously urges pressure sensitive adhesive surface 15 of film 13 onto the top surface of glass substrates 12 at film application line 41.

As explained hereinbefore, the width of film 13 is precisely equal to the width of glass substrates 12, and guide means 30 accurately align the substrates with application means 40. As a result, there is no widthwise overhang or widthwise shortage of film 13 relative to glass substrates 12. However, since film 13 is continuously applied by application means 40, lengthwise overhang 19 will result. Overhang 19 is readily removed by cutting the film along the leading and trailing edges of glass substrates 12 by any suitable means designated generally by arrows 51.

The flexible film 13, carried on supply reel 42 of application means 40 is conventional. More particularly, any transparent thermoplastic film having the backing and adhesive qualities of the type described, and which, when laminated onto glass substrates 12 meet the requirements of the American National Sales Institute for shatterproof glass will be sufficient. Accordingly, the laminated substrates continuously emerging from application means 40 represent high quality sheets of shatterproof glass. The completed sheets can then be transported by means of conveyor 50 to a packaging station (not shown), where they are readied for shipment.

In view of the foregoing, it is clear that the machine described above discloses an improved system for laminating glass substrates in the manufacture of sheets of shatterproof glass. It is also clear that numerous refinements and modifications which do not part from the true scope of the invention will be apparent to those skilled in the art. Accordingly, all such refinements and modifications are intended to be covered by the appended claims.

I claim:

1. A machine for continuously laminating flexible film onto a succession of glass substrates comprising:
    first conveyor means, adapted to receive a succession of glass substrates, and to transport said glass substrates along a horizontal plane;
    substrate preparation means, cooperating with said conveying means, for receiving therefrom said succession of glass substrates and washing one surface thereof;
    application means, adapted to continuously unroll a quantity of flexible film having a pressure sensitive adhesive surface, said application means exposing said pressure sensitive adhesive surface of said flexible film along a predetermined application line on said horizontal plane; and
    guide means, for alignably transporting said succession of glass substrates from said substrate preparation means to said predetermined application line, said guide means including roller means adapted to facilitate the movement of glass substrates along said guide means, and said roller means, at the area of contact with said succession of glass substrates, having a greater cross-sectional dimension than the cross-sectional dimension of said roller means at substantially all areas below said area of contact, whereby said flexible film is continuously laminated onto one surface of each of a succession of glass substrates.

2. The machine set forth in claim 1 wherein said roller means include a plurality of inverted truncated conical rollers.

3. The machine set forth in claim 2 further includes second conveyor means, cooperating with said application means, adapted to transport a succession of laminated glass substrates therefrom.

4. The machine set forth in claim 2 further includes sanitary enclosure means, enclosing at least that portion of said machine extending from the place at which one surface of the glass substrate is washed to the place at which the flexible film is applied to the glass substrate.

5. The machine set forth in claim 2 wherein said application means further include means for removing a backing originally applied to said flexible film, and takeup means for collecting said backing.

6. The machine set forth in claim 2 wherein said guide means include a guide rail, disposed perpendicularly to said predetermined application line, for aligning the leading edge of each glass substrate therewith.

7. The machine set forth in claim 6 wherein said guide means further include a movable horizontal surface in said horizontal plane, having a direction of movement toward a predetermined application line at an acute angle with said guide rail.

8. A machine for continuously laminating flexible film onto a succession of glass substrates comprising:
    first conveyor means, adapted to receive a succession of glass substrates, and to transport said glass substrates along a horizontal plane;
    substrate preparation means, cooperating with said conveying means, for receiving therefrom said succession of glass substrates and washing one surface thereof;
    application means, adapted to continuously unroll a quantity of flexible film having a pressure sensitive adhesive surface, said application means exposing said pressure sensitive adhesive surface of said flexible film along a predetermined application line on said horizontal plane; and
    guide means, for alignably transporting said succession of glass substrates from said substrate preparation means to said predetermined application line, said guide means including roller means adapted to facilitate the movement of glass substrate along said guide means, said roller means including a plurality of inverted truncated conical rollers, whereby said flexible film is continuously laminated onto one surface of each of a succession of glass substrates.

9. The machine set forth in claim 8 further includes second conveyor means, cooperating with said application means, adapted to transport a succession of laminated glass substrates therefrom.

10. The machine set forth in claim 8 further includes sanitary enclosure means, enclosing at least that portion of said machine extending from the place at which one surface of the glass substrate is washed to the place at which the flexible film is applied to the glass substrate.

11. The machine set forth in claim 8 wherein said application means further include means for removing a backing originally applied to said flexible film, and takeup means for collecting said backing.

12. The machine set forth in claim 8 wherein said guide means include a guide rail, disposed perpendicularly to said predetermined application line, for aligning the leading edge of each glass substrate therewith.

13. The machine set forth in claim 12 wherein said guide means further include a movable horizontal surface in said horizontal plane, having a direction of movement toward a predetermined application line at an acute angle with said guide rail.

* * * * *